US012641351B2

(12) United States Patent (10) Patent No.: US 12,641,351 B2
Lee et al. (45) Date of Patent: May 26, 2026

(54) METHOD AND APPARATUS FOR HIGH-SPEED CHARGE-COUPLED CMOS TDI IMAGING

(71) Applicant: TELEDYNE DIGITAL IMAGING, INC., Waterloo (CA)

(72) Inventors: Hyun Jung Lee, Waterloo (CA); Paul Donegan, Kitchener (CA)

(73) Assignee: TELEDYNE DIGITAL IMAGING, INC., Waterloo (CA)

( * ) Notice: Subject to any disclaimer, the term of this patent is extended or adjusted under 35 U.S.C. 154(b) by 394 days.

(21) Appl. No.: 18/025,729

(22) PCT Filed: Sep. 10, 2020

(86) PCT No.: PCT/CA2020/051216
§ 371 (c)(1),
(2) Date: Mar. 10, 2023

(87) PCT Pub. No.: WO2022/051834
PCT Pub. Date: Mar. 17, 2022

(65) Prior Publication Data
US 2024/0022835 A1     Jan. 18, 2024

(51) Int. Cl.
*H04N 25/768*      (2023.01)
*H04N 25/77*      (2023.01)
*H04N 25/78*      (2023.01)
(52) U.S. Cl.
CPC ........... *H04N 25/768* (2023.01); *H04N 25/77* (2023.01); *H04N 25/78* (2023.01)

(58) Field of Classification Search
CPC ...... H04N 25/768; H04N 25/77; H04N 25/78; H04N 25/00; H04N 25/616; H04N 25/711; H04N 25/75
See application file for complete search history.

(56) References Cited

U.S. PATENT DOCUMENTS

| | | |
|---|---|---|
| 2004/0017224 A1 | 1/2004 | Tumer et al. |
| 2006/0181627 A1 | 8/2006 | Farrier |
| 2011/0019044 A1 | 1/2011 | Wang et al. |

(Continued)

OTHER PUBLICATIONS

Thesis 2016 Time-Delay-Integration CMOS Image Sensor Design for Space Applications, 2016, 190 pages.

(Continued)

*Primary Examiner* — Nhan T Tran

(57) ABSTRACT

A method and apparatus (e.g. circuitry) provide high-speed charge-coupled CMOS TDI imaging based on the parallel readout operation of multiple TDI stages. A plurality (N) of output registers are reset and precharged globally in parallel ready to take charge transferred from the same number (N) of the TDI pixel registers. Each of the signal charges at respective output registers is converted to a signal voltage in parallel. Each of the analog signal voltages is then converted to a digital value in parallel by each of the number of the ADCs. The AD conversion is also performed in parallel while the next N number of the TDI registers is processed. The N output registers are linked to receive the charges from a beginning of the registers along to an end. Converting the respective signal voltages is performed by S/H capacitor array circuitry in a ping-pong fashion using CDS voltages.

18 Claims, 4 Drawing Sheets

(56) References Cited

U.S. PATENT DOCUMENTS

| 2011/0279725 | A1 | 11/2011 | Cazaux et al. | |
| 2012/0062773 | A1 | 3/2012 | Cieslinski | |
| 2013/0057931 | A1* | 3/2013 | Mayer | H04N 25/713 |
| | | | | 358/494 |
| 2013/0076949 | A1 | 3/2013 | Compton et al. | |
| 2013/0140609 | A1 | 6/2013 | Mayer et al. | |
| 2017/0180667 | A1* | 6/2017 | Nie | H04N 25/78 |
| 2017/0264836 | A1 | 9/2017 | Mandelli et al. | |
| 2019/0289237 | A1 | 9/2019 | Verbugt et al. | |
| 2020/0068154 | A1* | 2/2020 | Nam | H04N 25/71 |

OTHER PUBLICATIONS

A Novel Sensor for High Resolution Earth Observation, Oct. 2018, 1 page.

International Search Report dated Apr. 22, 2021 for corresponding International PCT Application No. PCT/CA2020/051216, 4 pages.

Written Opinion dated Apr. 22, 2021 for corresponding International PCT Application No. PCT/CA2020/051216, 5 pages.

Extended Europen Search Report Dated Mar. 25, 2024, 9 Pages, for Corresponding European Patent Application No. 20952664.9.

* cited by examiner

600A

614

610

606

602

601

604

608

612

616

600B

606

602

604

608

612

METHOD AND APPARATUS FOR HIGH-SPEED CHARGE-COUPLED CMOS TDI IMAGING

FIELD

This disclosure relates to complementary metal-oxide-semiconductor (CMOS) time delay and integration (TDI) high fidelity imaging methods and apparatus thereof for parallel readout operation.

BACKGROUND

In a conventional CMOS TDI imager, readout operation is performed sequentially as follows: 1. A floating diffusion (FD) is reset to a reset drain voltage (VDD) through a reset gate (RST). A reset signal stored at the floating diffusion at the moment is sampled via a source follower (SF) to a sample and hold (S/H) capacitor. This operation takes about 500 ns. 2. Signal charge in the last TDI stage is transferred to the FD. This operation takes about 800 ns. 3. The signal charge is converted to a signal voltage at the FD and the signal voltage is sampled via the SF to the S/H capacitor for correlated double sampling (CDS) operation. This operation takes about 500 ns. 4. The analog signal voltage is then converted to a digital value by an analog to digital converter (ADC). This operation takes about 1.2 μs. The total time required to complete one line processing takes therefore about 3 μs. This sequential readout operation limits the sensor speed, i.e., TDI scan rate, currently to about 300 kHz.

U.S. Pat. No. 4,309,624A to Texas Instruments relates to a "Floating gate amplifier method of operation for noise minimization in charge coupled devices". There is described a method of operating a charge-coupled device (CCD) having a non-destructive readout floating gate amplifier to minimize noise on the floating gate.

SUMMARY OF THE INVENTION

In accordance with an embodiment, there is provided a method and apparatus (e.g. circuitry) for high-speed, multiple TDI stages-based parallel readout operation. A plurality (N) of output registers are reset and precharged globally in parallel and ready to take charge transferred from the same number (N) of TDI pixel registers. Each of the signal charges at each of the output registers is converted to a signal voltage in parallel. Each of the analog signal voltages is then converted to a digital value in parallel by each of the (N) number of the ADCs. The N output registers are linked to receive the charges from a beginning of the registers along to an end. The AD conversion is also performed in parallel while the next (N) number of the TDI registers is processed. Converting the respective signal voltages is performed by S/H capacitor array circuitry in a ping-pong fashion using respective CDS voltages.

In accordance with an embodiment, there is provided a method comprising: performing a readout of a plurality of TDI pixel registers to receive respective signal charges to a plurality of output registers; performing a parallel conversion of the plurality of the output registers by: converting the respective signal charges in parallel to respective signal voltages; and converting the respective signal voltages in parallel to respective digital values.

In an embodiment, the method comprises resetting the plurality of output registers in parallel to receive the respective signal charges. Resetting the plurality of output registers in parallel may comprise emptying the output registers to a reset drain voltage through reset gates in parallel.

In an embodiment, the output registers are linked, one to the next, from a beginning to an end and wherein performing a readout comprises transferring the respective signal charges to be received at a beginning for further transfer within the plurality of output registers (e.g. along to the end to fill the registers).

To perform a readout comprises, in an embodiment, receiving the respective signal charges at respective potential wells underneath respective floating gates that comprise the respective output registers. In an embodiment, the channel potential of the potential wells is set by a reference voltage via a precharge gate. In an embodiment, each of the respective floating gates is coupled to respective SFs to provide the respective signal voltages for conversion to the respective digital values.

In an embodiment, converting the respective signal voltages comprises the following operations of S/H capacitor array circuitry in a ping-pong fashion: sampling in parallel respective reference voltages at a present time to the respective first reference capacitors of the respective S/H capacitor arrays; sampling in parallel the respective earlier in time signal voltages to respective signal capacitors; and providing in parallel respective CDS voltages from the respective earlier in time reference voltages sampled at respective second reference capacitors and the respective earlier in time signal voltages sampled at the signal capacitors to respective ADCs to produce the respective earlier in time digital values. In an embodiment, the method further comprises: in further parallel, receiving the next in time respective reference voltages to the respective second reference capacitors and the present signal voltages to the respective signal capacitors; and providing in parallel respective CDS voltages from the respective present reference voltages sampled at the respective first reference capacitors and the respective present signal voltages sampled at the signal capacitors to respective ADCs to produce the respective present digital values.

In an embodiment, converting the respective signal voltages in parallel to respective digital values is performed at a present time and further in parallel with a performing of a readout of a next in time plurality of respective signal charges to the plurality of output registers.

In an embodiment, the readout of the plurality of TDI registers to receive the respective signal charges is performed at a present time and further in parallel with a converting of respective earlier in time signal voltages to respective earlier in time digital values.

In an embodiment, a high-speed CMOS TDI image sensor comprises a plurality of CCD pixels arranged in a form of a matrix, (e.g. a pixel array with multiple rows and columns) comprising TDI pixel registers and output registers coupled thereto. A column slice thereof comprises a plurality of TDI pixel registers from a column and a plurality of output registers from the column. In an embodiment, the column slice further comprises a S/H capacitor array circuitry coupled to the plurality of output registers and a column-parallel ADC coupled to the S/H capacitor array circuitry for parallel operation.

In an embodiment, a pixel array may comprise a plurality of output registers at both ends of TDI pixel registers for bidirectional scanning operation. Respective output registers (e.g. top (first) output registers and bottom (second) output registers) at respective ends may be connected to respective S/H capacitor arrays and column-parallel ADCs at both ends of the pixel array, or respective output registers at respective ends may be multiplexed to S/H arrays and column-parallel ADCs located at one (e.g. bottom) end of the pixel array. In an embodiment, the method is performed using one of the top output registers and the bottom output registers as the plurality of output registers in response to the reverse and forward directions of TDI scanning, respectively.

There is provided an apparatus comprising: a plurality of output registers coupled to receive respective signal charges readout from a plurality of TDI registers; wherein each of the plurality of output registers is configured with circuitry providing parallel reset functionality, parallel charge sensing functionality and charge transfer functionality; and each of the plurality of output registers is coupled to column-parallel ADCs to produce respective digital values for each of respective signal charges.

In an embodiment, each of the output registers is coupled to an ADC via respective S/H capacitors for CDS operation.

In an embodiment, the parallel charge sensing functionality for each of the plurality of output registers converts the respective signal charges stored to a group of potential wells to respective signal voltages for the parallel ADCs.

In an embodiment, the apparatus is configured to readout next in time respective signal charges to the output registers while the parallel ADCs convert the respective signal charges from a present time.

In an embodiment, each of the output registers is coupled to the parallel ADCs via respective S/H capacitor arrays, each of the arrays comprising two reference capacitors for ping-pong style S/H operation and a signal capacitor.

In an embodiment, the respective S/H capacitor arrays collectively operate to: sample in parallel respective reference voltages at a present time to the respective first reference capacitors of the respective S/H capacitor arrays; sample in parallel the respective earlier in time signal voltages to respective signal capacitors; and provide in parallel respective CDS voltages from the respective earlier in time reference voltages sampled at respective second reference capacitors and the respective earlier in time signal voltages sampled at the signal capacitors to respective ADCs to produce the respective earlier in time digital values. In an embodiment, the respective S/H capacitor arrays collectively further operate to: in further parallel, receive the next in time respective reference voltages to the respective second reference capacitors and the present signal voltages to the respective signal capacitors; and provide in parallel respective CDS voltages from the respective present reference voltages sampled at the respective first reference capacitors and the respective present signal voltages sampled at the signal capacitors to respective ADCs to produce the respective present digital values.

In an embodiment, the apparatus comprises a CMOS TDI image sensor wherein a plurality of CCD pixels is arranged in a form of a matrix and a column slice thereof comprises a plurality of TDI pixel registers coupled to a plurality of output registers.

In an embodiment, the apparatus comprises a CMOS TDI image sensor wherein a plurality of CCD pixels is arranged in a form of a matrix, a column slice thereof comprises the plurality of TDI pixel registers coupled to first output registers at a first end of the plurality of TDI pixel registers and coupled to second output registers at a second end of the plurality of TDI pixel registers, and a plurality of S/H capacitor array circuitry and a plurality of column-parallel ADCs are coupled to the first and second output registers for bidirectional operation (e.g. wherein the first or second output registers are selective in responsive to a direction of scanning). In an embodiment, respective instances of the plurality of S/H capacitor array circuitry and the plurality of column-parallel ADCs are coupled to the first and second output registers. In an embodiment, a single instance of the plurality of S/H capacitor array circuitry and the plurality of column-parallel ADCs are coupled for shared use to the first and second output registers, such as through multiplexing.

In an embodiment, there is provided an apparatus (e.g. a CMOS TDI image sensor) comprising circuitry configured to perform a method according to any method aspect as described.

These and other aspects will be apparent to a person of ordinary skill in the art.

DESCRIPTION

Figure 1:
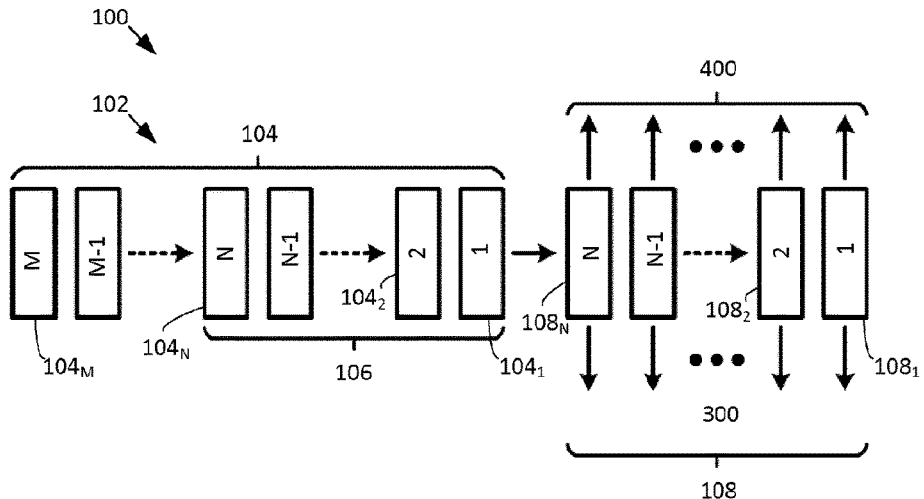
FIG. 1 is a block diagram showing a column slice of a high-speed charge-coupled CMOS TDI imager pixel matrix.

FIG. 1 shows a block diagram of a (partial) high-speed charge-coupled CMOS TDI imager pixel array 100, in accordance with an embodiment. Pixel array 100 is partial in that shown is a column slice 102 thereof, the pixel array 100 comprising additional columns. Column slice 102 comprises a plurality (M) of TDI registers 104 (e.g. pixel registers) comprising individual TDI (pixel) registers (e.g. $104_1$, $104_2$, ... $104_N$, ... and $104_M$), a plurality of N TDI registers 106 comprising a subset of the TDI registers $104_1$, $104_2$, ... and $104_N$, where N is less than or equal to M, and a plurality of N output registers 108 comprising individual output registers (e.g. $108_1$, $108_2$, ... and $108_N$).

The plurality M of TDI registers 104 is coupled to a plurality of N output registers 108 to receive signal charges from the plurality N of TDI registers 106. The output registers 108 each have global signal reset functionality 300 and N parallel conversion functionality 400 as further described in FIGS. 3 and 4. In order to place all reset functionality, charge-transfer functionality and charge sensing functionality in one place, the output registers 108 support nondestructive readout with reset capability. The individual output registers are linked, one to the next, from a beginning to an end such that when performing a readout, the respective signal charges are transferred to be received at a beginning for further transfer within the plurality of output registers (e.g. along to the end to fill the registers).

In accordance with an embodiment, and in contrast to the traditional readout operation earlier described, high-speed, multiple TDI stages-based parallel operation is achieved as follows.

The plurality (N) of output registers 108 is reset globally in parallel (e.g. in accordance with an embodiment, via functionality 300) and ready to take a charge transferred from the plurality (N) of TDI pixel registers 106.

The charges accumulated in the plurality (N) of TDI registers 106 (e.g. out of the total plurality (M) of TDI registers 104) is transferred along the linked N output registers 108 from the beginning all the way to the end of the N output registers 108.

Each of the signal charges at each of the N output registers 108 is converted to a signal voltage in parallel (e.g. in accordance with an embodiment, via functionality 400).

Further via functionality 400, each of the analog signal voltages is then converted to a digital value in parallel by each of N number of ADCs. In accordance with an embodiment, the A/D conversion is also performed in parallel while next respective signal charges from N number of the TDI registers is processed. Each of the output registers is coupled to the parallel ADCs via respective S/H capacitor arrays for CDS operation. Each of the S/H capacitor arrays comprise two reference capacitors for ping-pong style S/H operation and a signal capacitor.

Figure 2:
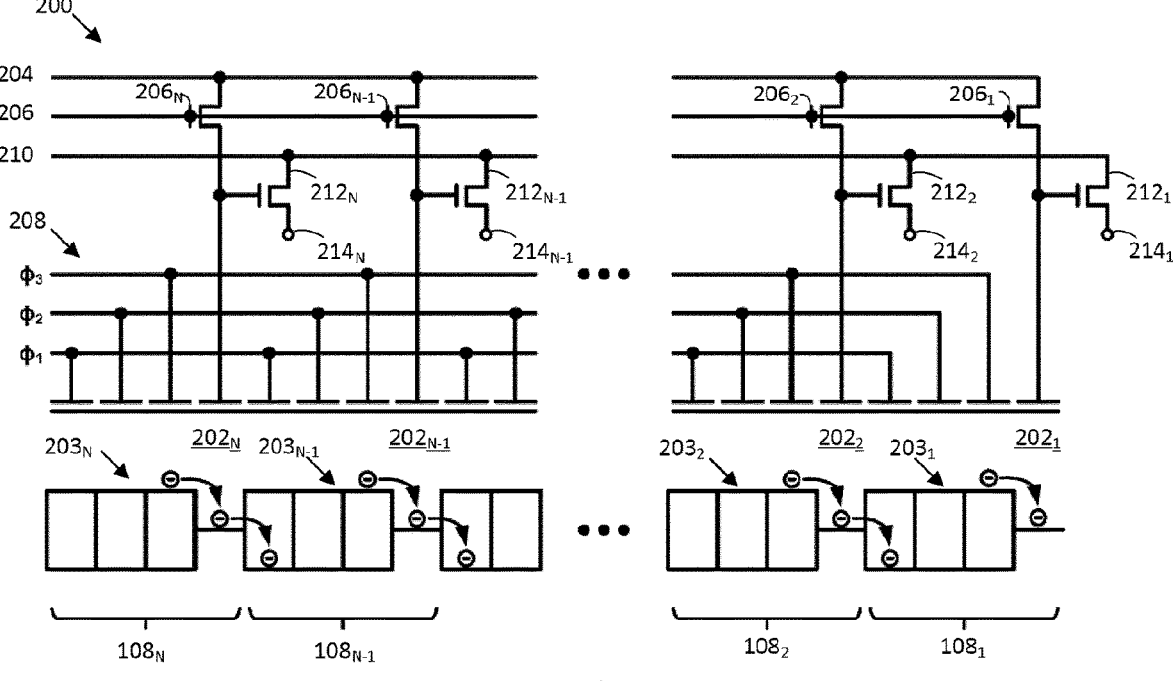
FIG. 2 is a block diagram of output registers, in accordance with an embodiment, comprising a floating gate configuration.
Figure 3:
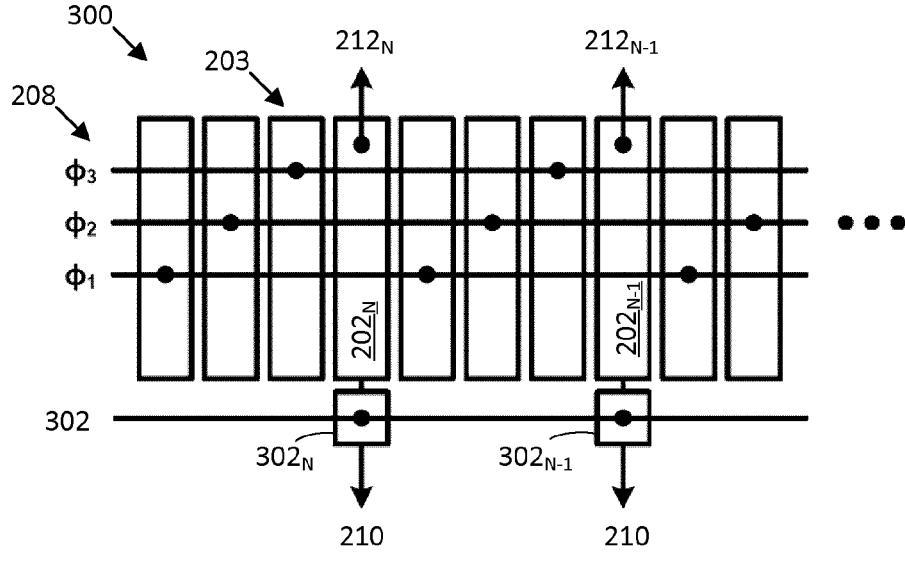
FIG. 3 is a block diagram showing a global reset of floating gates of FIG. 2, in accordance with an embodiment.

In accordance with respective embodiments, to incorporate all the functionalities there is provided a Floating Gate (FG) configuration 200 of output registers and the global reset functionality 300 as shown in FIGS. 2 and 3, respectively.

In an embodiment, respective output registers $108_1$, $108_2$, . . . $108_{N-1}$, and $108_N$ are shown as comprising respective group of three-phase (e.g. $\Phi_1$, $\Phi_2$ and $\Phi_3$) charge transfer gates (e.g. $203_1$, $203_2$, . . . $203_{N-1}$, and $203_N$ and collectively 203) and a respective floating gate (e.g. $202_1$, $202_2$, . . . $202_{N-1}$, and $202_N$). Each respective group is linked to an adjacent group, one to the next, such that when performing a readout, respective signal charges from the plurality (N) of TDI registers 106 are transferred from the beginning $108_N$ to the end $108_1$ of the plurality (N) of output registers 108.

FIG. 2 shows a channel potential diagram and corresponding charge transfer. Each of floating gates $202_1$, $202_2$, . . . $202_{N-1}$, and $202_N$ (collectively, a plurality of (N) floating gates 202) is coupled to a reference voltage (Vref) 204 via respective precharge (PRC) gates (e.g. $206_1$, $206_2$, . . . $206_{N-1}$, and $206_N$). Each of the PRC gates $206_1$, $206_2$, . . . $206_{N-1}$, and $202_N$ is driven by a PRC 206.

A drain voltage (VDD) 210 is coupled to respective source followers (e.g. $212_1$, $212_2$, . . . $212_{N-1}$, and $212_N$). Each of the source followers $212_1$, $212_2$, . . . $212_{N-1}$, and $212_N$ is coupled to a respective floating gate $202_1$, $202_2$, . . . $202_{N-1}$, and $202_N$ and Vref 204 (via the respective PRC gates $206_1$, $206_2$, . . . $206_{N-1}$, and $202_N$). Though not shown in FIG. 2 but shown in FIG. 4, each of the source followers $212_1$, $212_2$, . . . $212_{N-1}$, and $212_N$ is also coupled to a respective S/H capacitor array circuit (e.g. via $214_1$, $214_2$, . . . $214_{N-1}$, and $214_N$) for CDS operation via a respective select (SEL) switch (e.g. $420_N$).

FIG. 3 is a block diagram showing the global reset functionality 300 for two floating gates $202_{N-1}$ and $202_N$ of FIG. 2, in accordance with an embodiment, and where only two of the floating gates 202 are shown for simplicity. A reset signal 302 is coupled to reset gates $302_{N-1}$ and $302_n$ between reset drain (VDD) 210 and each floating gate $202_{N-1}$ and $202_N$. Each floating gate $202_{N-1}$ and $202_n$ is also shown coupled to the respective source follower $212_{N-1}$ and $212_N$.

Figure 4:
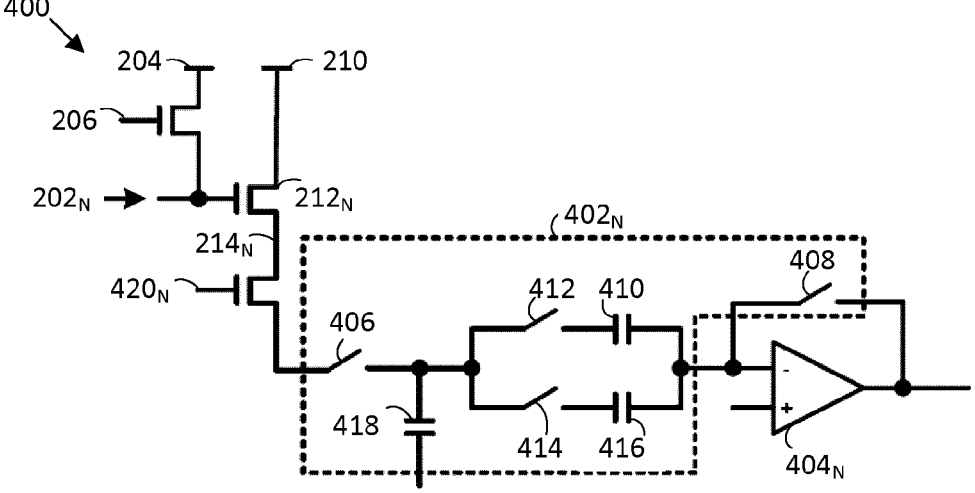
FIG. 4 is a block diagram showing an embodiment of an S/H capacitor circuit and a column-parallel ADC providing parallel conversion functionality.

In FIG. 4, there is shown a portion of the n parallel conversion functionality 400, in accordance with an embodiment for a representative nth floating gate $202_N$. FIG. 4 shows detail for one output register of the N output registers 108, namely output register $108_N$. S/H capacitor array circuit $402_n$ (within the dotted outline) and the comparator $404_N$ of a $n^{th}$ column-parallel ADC are connected to the nth output register $108_N$ comprising floating gate $202_N$. For simplicity, components within S/H capacitor array circuit $402_N$ are labeled without subscripts but it will be understood that each respective array circuit has respective components for the parallel operation. Each S/H capacitor array circuit of the N arrays comprises two reference capacitors for ping-pong style S/H operation and a signal capacitor. The N instances of the S/H capacitor array circuitry perform operations to: sample in parallel respective reference voltages at a present time to the respective first reference capacitors of the respective S/H capacitor arrays; sample in parallel the respective earlier in time signal voltages to respective signal capacitors; and provide in parallel respective CDS voltages from the respective earlier in time reference voltages sampled at respective second reference capacitors and the respective earlier in time signal voltages sampled at the signal capacitors to respective ADCs to produce the respective earlier in time digital values as further described.

Figure 5:
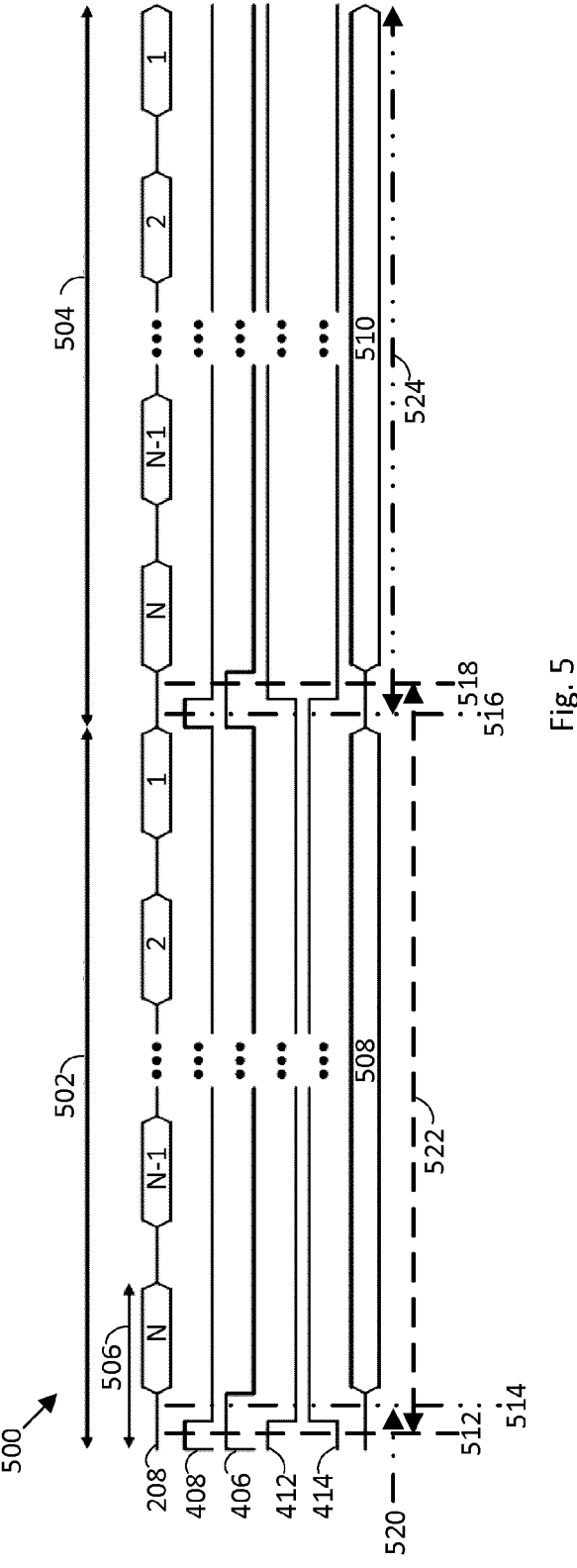
FIG. 5 is a block diagram showing operational timing in accordance with an embodiment.

Operation of FIG. 4 is also understood with reference to FIG. 5 showing operational timing 500 in accordance with an embodiment. FIG. 5 shows processing periods 502 and 504 to process present N TDI rows and next N TDI rows (for two successive readouts and AD conversions, each of which overlaps in time, converting a previous readout while performing a present readout). A single line period (i.e. TDI scan rate) of a processing period (e.g. 502) is shown at 506. FIG. 5 also shows AD conversion windows 508 and 510 for the previous N TDI rows and the present N TDI rows.

The even dashed vertical line 512 represents the time when the Vref 204 of a present time is sampled at a first reference capacitor Cref1 410. The double dot and dashed vertical line at 514 represents the time when the signal voltage (Vsig) of a previous time is sampled at a signal capacitor Csig 418 ready for CDS operation. The double dot and dashed vertical line 516 represents the time when Vref 210 of a next time is sampled at Cref2 412. The even dashed vertical line 518 represents the time when the Vsig of the present time is sampled at Csig 418 for CDS operation. The even dashed arrow 522 from 512 to the even dashed vertical line at 518 represents a CDS interval for the present time, which AD conversion 510 takes place in a next time period. The double dot and dashed arrow 520 ending at 514 represents a CDS interval for the previous time, which AD conversion 508 takes place in the present time. The double dot and dashed arrow 524 starting at 516 represents a CDS interval for the next time, which AD conversion takes place in a further next time period (not shown).

With reference again to FIG. 4, when both S/H switches (a sample and hold signal (SHS) switch 406 and a sample and hold reset (SHR) switch 408) are closed, Vref 210 is sampled to Cref1 410 when a first S/H switch (SH1 switch 412) is closed and a second S/H switch (SH2 switch 414) is open.

Then both the SHR switch 408 and the SH1 switch 412 are open to hold the Vref 210 at Cref1 410. At the same time, the SH2 switch 414 is closed for CDS operation with the Vsig sampled at Csig 418, which signal charges were transferred from a previous readout of the nth TDI register (i.e. in a previous processing period). Then the SHS switch 406 is open for the next cycle.

The AD conversion of the signal voltages for the previous N number of the TDI registers (via the N respective S/H capacitor arrays and ADCs) takes place while the signal charges stored in the present N number of the TDI registers 104 are transferred to the n number of the output registers 108. This completes one cycle 502 of the operational timing 500 provided in FIG. 5.

For the next cycle 504, when both SHS switch 406 and SHR switch 408 are closed again, the Vref 210 is sampled to Cref2 416 when SH2 switch 414 is closed and SH1 switch 412 is open. Then both the SHR switch 408 and the SH2 switch 414 are open to hold the Vref at Cref2. At the same time, the SH1 switch 412 is closed to sample the signal charges at Cref1 410, which were transferred from the present N number of the TDI registers. Then the SHS switch 406 is open to hold the signal voltage at Csig 418.

The AD conversion of the signal voltages for the present N number of the TDI registers takes place while the signal charges stored in the next N number of the TDI registers are transferred to the N number of the output registers.

Detailed operation, in accordance with the embodiments of FIGS. 1-5, is as follows. Previous signal charge stored under the (N) floating gates 202 of the (N) output registers 108 are emptied to VDD 210 through respective RSTs (e.g. the $n^{th}$ such RST being $302_N$). This operation is performed globally in parallel as illustrated in FIG. 3.

The channel potential of the floating gates 202 is set by a Vref 204 via respective PRC gates (e.g. the nth such gate being $206_N$ to set potential wells $202_N$) and ready to receive signal charges from the (N) TDI pixel registers 106 (the nth such register being $104_N$). The Vref 204 is sampled and held in an each of the S/H capacitor array circuits (e.g. within nth such S/H capacitor array circuit being $402_N$).

The signal charges accumulated in the plurality (N) of the TDI registers 106 are transferred all the way to the end of the plurality (N) of floating gates 202 by three-phase charge transfer gates 203 of the output registers 108.

Each of the signal charges stored under each of the floating gates is converted to a signal voltage and is outputted via a SF in parallel. The signal voltage also is sampled to each of the S/H capacitors in parallel.

Each of the analog signal voltages is then converted to a digital value by each of the n ADCs in parallel, the nth such ADC being $404_N$. The AD conversion is also performed in parallel (e.g. simultaneously or at the same time) while the next in time N number of the TDI registers 104 (i.e. a next in time plurality (N) of signal charges) is transferred to the output registers 108. That is, for a first plurality (N) of respective signal charges transferred out at a present time (e.g. at a time $T_0$), after conversion to respective present voltage signals, as those respective present voltage signals are converted to present digital values, a second plurality (N) of respective next signal charges are readout at a next time immediately after the present time (e.g. at a $T_1$) from the plurality of (N) TDI registers 104 to the plurality (N) of output registers 108. Similarly, when the first plurality (N) of respective signal charges are readout at the present time $T_0$, a plurality (N) of respective earlier signal charges, readout at an earlier time immediately prior to $T_0$ (e.g. at $T_{-1}$) is, after conversion to respective earlier voltage signals, converted to respective earlier digital values.

Figures 6A, 6B:
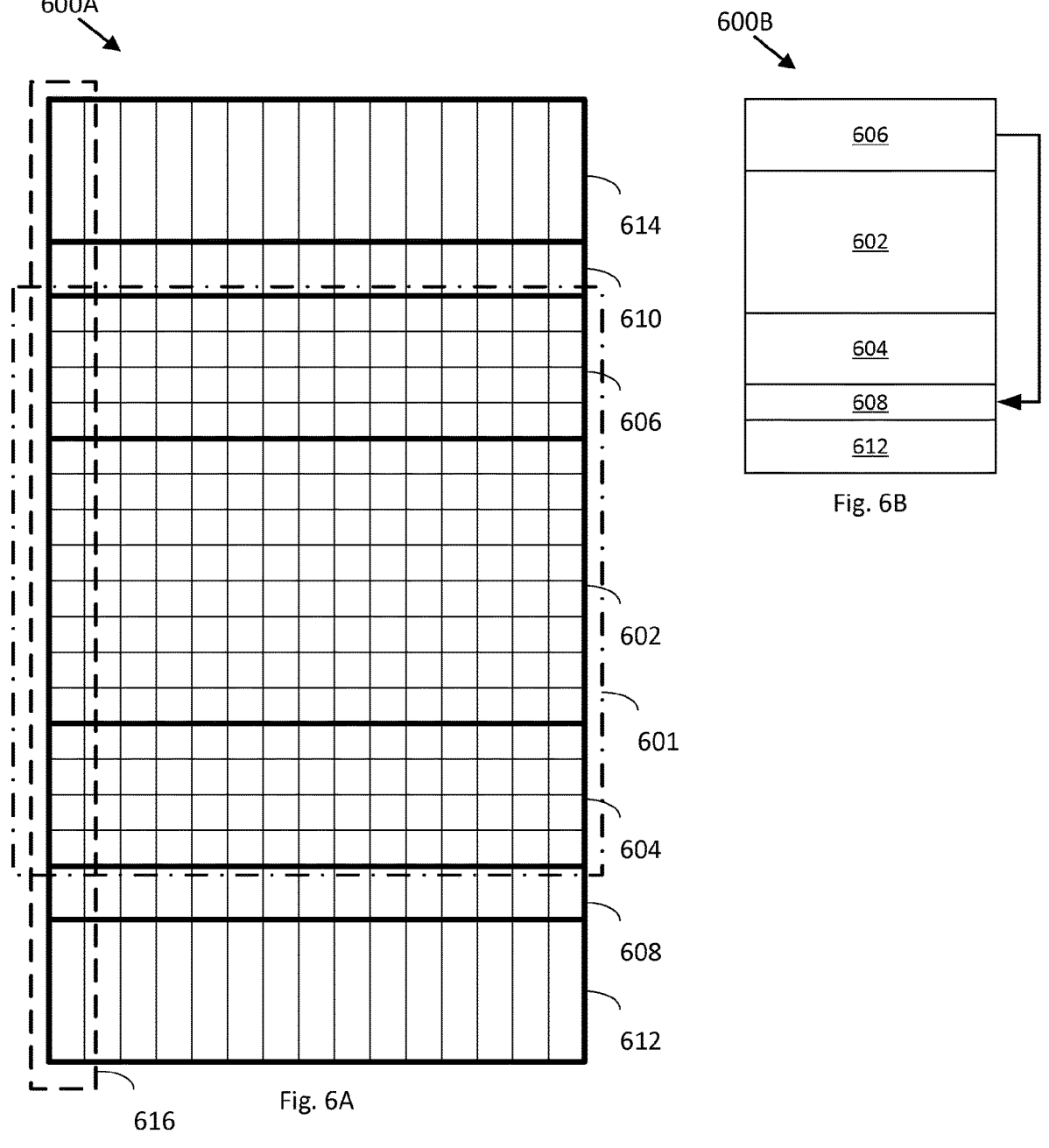
FIGS. 6A and 6B are block diagrams showing a column slice of a high-speed charge-coupled CMOS TDI imager pixel matrix configured for bidirectional operations in accordance with respective embodiments.

FIGS. 6A and 6B are block diagrams showing a high-speed charge-coupled CMOS TDI imager 600A and 600B configured for bidirectional operations in accordance with respective embodiments. Bidirectional operations are responsive to a direction of scanning (e.g. forward and reverse) performed by the CMOS TDI imager. In a first bidirectional embodiment, there is shown a CCD pixel array 601, marked by a broken dot dashed box, comprising a plurality of TDI pixel registers 602 having coupled at respective ends thereof a top (first) plurality of output registers 604 and a bottom (second) plurality of output registers 606.

The respective output registers 604 and 606 are connected to respective pluralities of S/H capacitor array circuits 608 and 610 and the array circuits 608 and 610 are coupled respective pluralities of column-parallel ADCs 612 and 614 respectively.

FIG. 6A shows a representative column slice 616 of CMOS TDI imager 600A, marked by an even dashed line. The column slice 616 comprises a column subset of the TDI pixel registers 602, a column subset of each of the output registers 604 and 606, a column subset of each of the S/H capacitor array circuits 608 and 610 and a column subset of each of the column-parallel ADCs 612 and 614. The column subset of the TDI pixel registers 602 is equivalent to the plurality of M TDI pixel registers 104. The column subsets of each of the output registers 604 and 606 is equivalent to the plurality of N output registers 108.

In a second bidirectional embodiment 600B, the respective output registers 604 and 606 at respective ends of TDI pixel registers 602 are multiplexed to S/H capacitor arrays 608 and column-parallel ADCs 612 located at one end of the TDI pixel registers 602.

It will be understood that FIGS. 6A and 6B are simplified and may be implemented using the structures of FIGS. 2-4, with suitable adaptation.

In an embodiment, during operation of the embodiments 600A or 600B, the methods as described herein are performed in a bidirectional manner, using one or the other of the first output registers and the second output registers (as the plurality of output registers) when performing the readout of a plurality of TDI pixel registers to the plurality of output registers and performing the parallel conversion of the plurality of output registers. In an embodiment, the selection of one or the other is responsive to a direction of scanning (e.g. performed by the CMOS TDI imager 600A or 600B). In an embodiment (e.g. 600A), output registers 604, S/H capacitor array circuits 608 and column-parallel ADCs 612 are used for a forward scanning direction and output registers 606, S/H capacitor array circuits 610 and column-parallel ADCs 614 are used for a reverse scanning direction. In an embodiment (e.g. 600B), output registers 604 and output registers 606 are multiplexed to S/H capacitor array circuits 610 and column-parallel ADCs 612 for a forward scanning direction and a reverse scanning direction, respectively.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise", "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A method comprising:

performing a read out of a plurality of Time Delay and Integration (TDI) Charge-Coupled Device (CCD) pixel registers, comprising active light responsive TDI pixel registers, arranged in a form of a matrix array, a column slice thereof comprising a column of the TDI pixel registers and a column of output registers coupled to an end of the column of the active TDI pixel registers and wherein respective signal charges accumulated over the plurality of the active TDI pixel registers in respective columns are transferred to the plurality of output registers in the corresponding columns, and the plurality of output registers is equal or fewer in number to the plurality of TDI pixel registers; and performing a parallel charge sensing operation in the plurality of the output registers and parallel charge conversion of operations by a plurality of source followers (SFs) coupled to the plurality of output registers and by a plurality of analog to digital converters (ADCs) coupled to the plurality of the SFs in respective columns of the matrix array in a column-parallel fashion.

2. The method of claim 1 comprising resetting the plurality of output registers to receive the respective signal charges.

3. The method of claim 2, wherein resetting the plurality of output registers comprises emptying the plurality of output registers to a reset drain voltage through reset gates in parallel.

4. The method of claim 1, wherein individual ones of the plurality of output registers are linked, one to the next, from a beginning to an end and wherein performing a readout comprises transferring the respective signal charges to be received at a beginning for further transfer within the plurality of output registers.

5. The method of claim 1, wherein to perform the read out comprises receiving the respective signal charges at respective potential wells underneath respective floating gates that comprise the respective output registers.

6. The method of claim 5, wherein each of the respective floating gates is coupled to respective ones of the source followers to provide the respective signal voltages for conversion to the respective digital values.

7. The method of claim 1, wherein performing the parallel charge conversion operations comprises:

providing in parallel respective correlated double sampled (CDS) voltages to respective column-parallel analog to digital converters (ADCs) to produce the respective digital values.

8. The method of claim 1, wherein performing the parallel charge conversion operations to respective digital values is performed at a present time further in parallel with a performing of a readout of a next in time plurality of respective signal charges to the plurality of output registers.

9. The method of claim 1, wherein performing the readout of the plurality of TDI registers to receive the respective signal charges is performed at a present time and further in parallel with performing the parallel charge conversion operations a converting of respective earlier in time signal voltages to respective earlier in time digital values.

10. The method of claim 1, wherein:

first output registers are coupled to one end of the TDI pixel registers;

second output registers are coupled to another end of the TDI pixel registers; and the method is performed using one of the first output registers and the second output registers as the plurality of output registers in response to a direction of scanning.

11. An apparatus comprising:

a plurality of output registers coupled to receive respective signal charges readout from a plurality of Time Delay and Integration (TDI) Charge Coupled Device (CCD) pixel registers, comprising active light responsive TDI pixel registers, arranged in a form of a matrix array, a column slice thereof comprising a column of TDI pixel registers and a column of the plurality of output registers, the column of the plurality of output registers coupled to an end of the column of the TDI pixel registers; wherein signal charges accumulated over the plurality of the TDI pixel registers in respective columns are transferable to the plurality of the output registers in the corresponding columns, the number of the output registers thereof is equal to the number of the TDI pixel registers or fewer; and wherein:

each of the plurality of output registers is configured with circuitry providing parallel reset functionality, parallel charge sensing functionality and charge transfer functionality; and each of the plurality of output registers is coupled to respective column-parallel analog to digital converters (ADCs) to produce respective digital values for each of respective signal charges.

12. The apparatus of claim 11, wherein each of the output registers is coupled to the respective ADCs via respective sample and hold (S/H) capacitors for correlated double sampled (CDS) operation.

13. The apparatus of claim 11, wherein the parallel charge sensing functionality for each of the plurality of output registers converts the respective signal charges stored to a group of potential wells to respective signal voltages for the respective column-parallel ADCs.

14. The apparatus of claim 11, wherein the apparatus is configured to readout next in time respective signal charges to the output registers while the respective column-parallel ADCs convert the respective signal charges from a present time.

15. The apparatus of claim 12, wherein the respective S/H capacitor arrays collectively operate to:

sample in parallel respective reference voltages at a present time to the respective first reference capacitors of the respective S/H capacitor arrays;

sample in parallel the respective earlier in time signal voltages to respective signal capacitors; and provide in parallel respective CDS voltages from the respective earlier in time reference voltages sampled at respective second reference capacitors and the respective earlier in time signal voltages sampled at the signal capacitors to the respective column-parallel ADCs to produce the respective earlier in time digital values.

16. The apparatus of claim 15, wherein the respective S/H capacitor arrays collectively further operate to:

in further parallel, receive the next in time respective reference voltages to the respective second reference capacitors and the present signal voltages to the respective signal capacitors; and provide in parallel respective CDS voltages from the respective present reference voltages sampled at the respective first reference capacitors and the respective present signal voltages sampled at the signal capacitors to the respective column-parallel ADCs to produce the respective present digital values.

17. The apparatus of claim 11 comprising a CMOS TDI image sensor wherein a plurality of CCD pixels is arranged in the form of the matrix.

18. The apparatus of claim 11 comprising a CMOS TDI image sensor, wherein the column slice thereof comprises the plurality of TDI pixel registers coupled to i) first output registers at a first end of the plurality of TDI pixel registers and ii) second output registers at a second end of the plurality of TDI pixel registers for bidirectional operation wherein one of the first output registers and the second output registers selectively defining the plurality of output registers in response to a direction of scanning.

* * * * *